Patented Mar. 13, 1923.

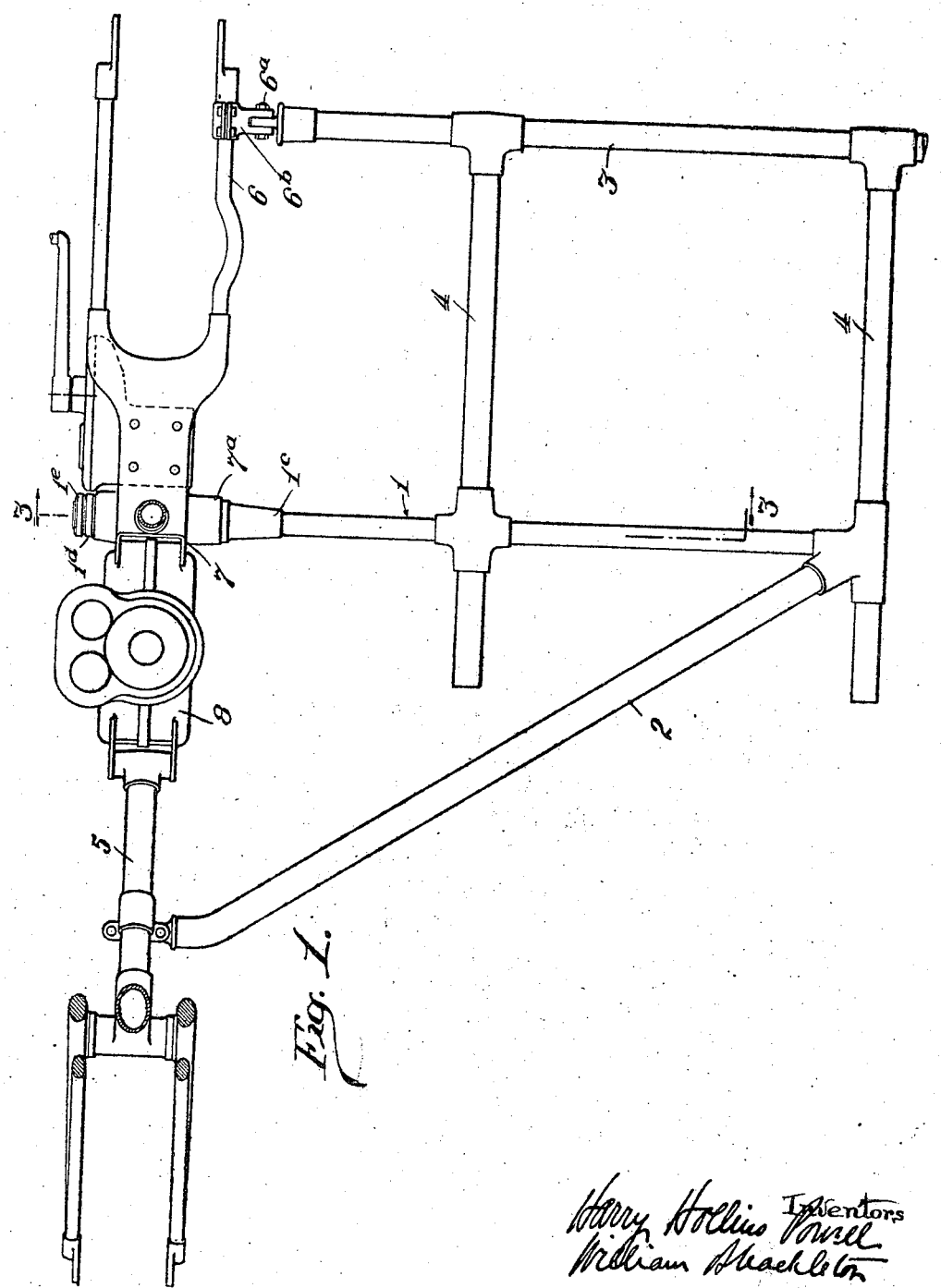

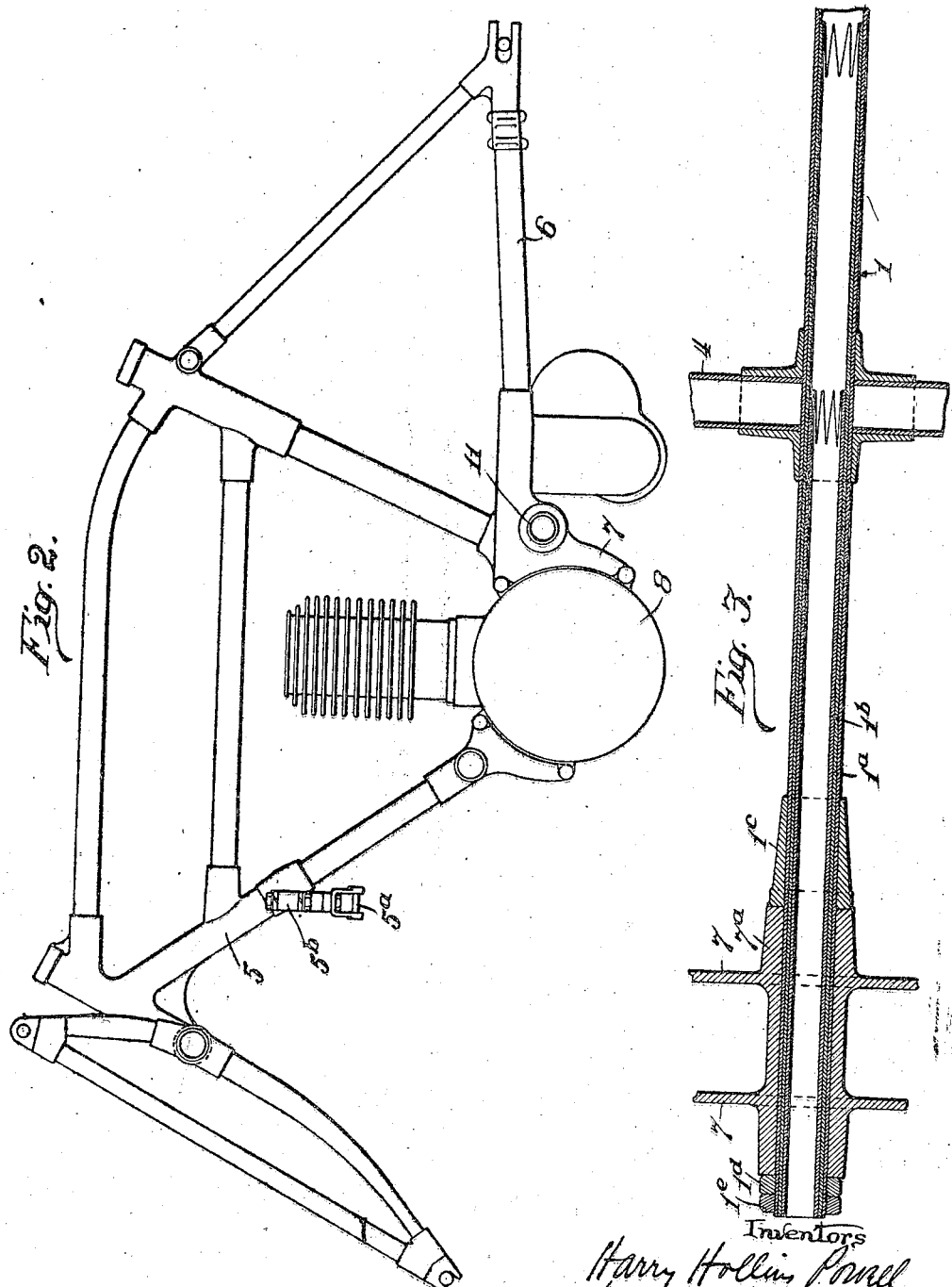

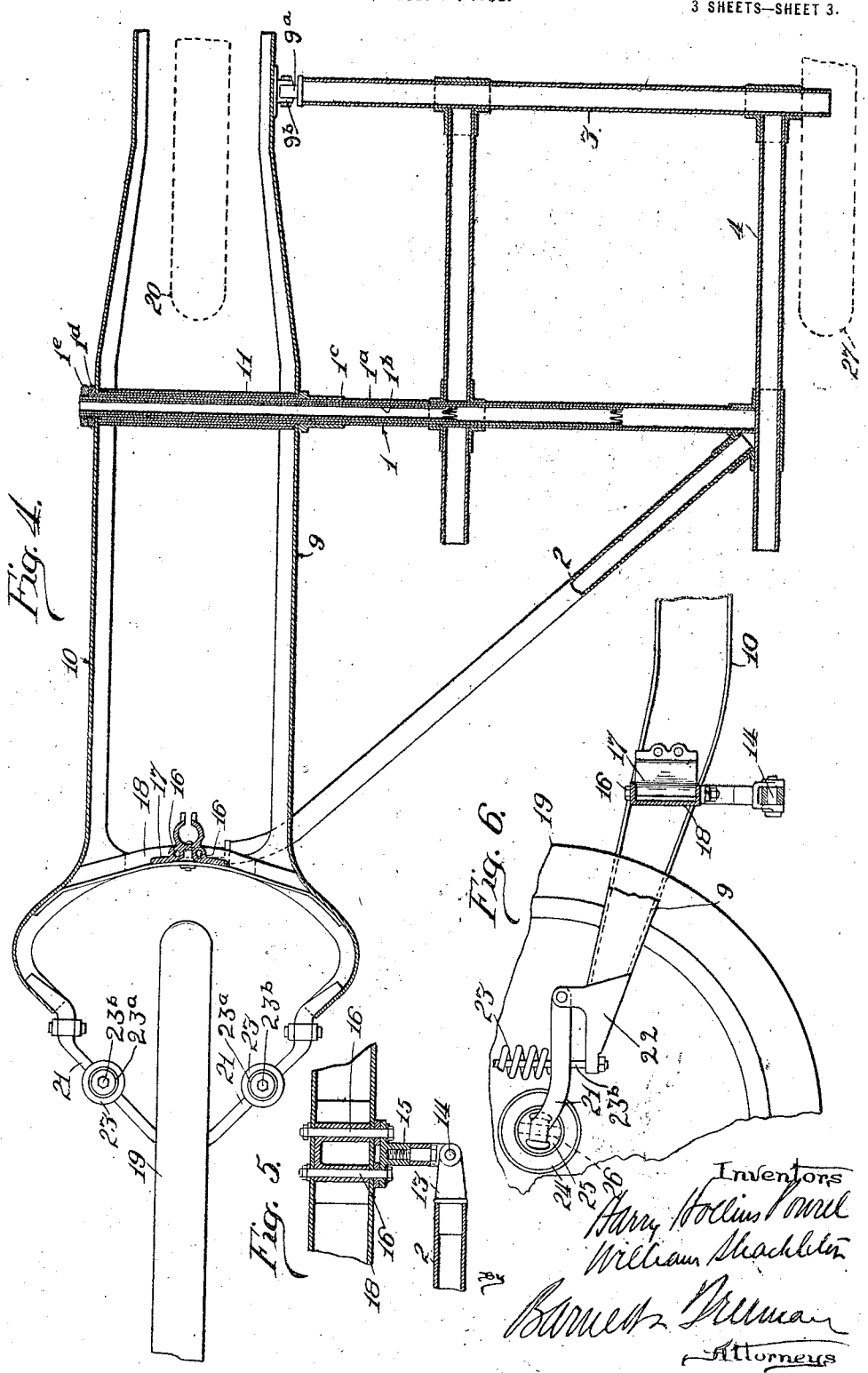

1,448,039

UNITED STATES PATENT OFFICE.

HARRY HOLLINS POWELL, OF SHEFFIELD, AND WILLIAM SHACKLETON, OF DATCHET, ENGLAND, ASSIGNORS TO JOSEPH ALLAN SMITH, OF SYRACUSE, NEW YORK.

SIDE CAR FOR MOTOR CYCLES.

Application filed July 10, 1922. Serial No. 574,023.

*To all whom it may concern:*

Be it known that we, HARRY HOLLINS POWELL and WILLIAM SHACKLETON, subjects of the King of Great Britain, residing at Sheffield, England, and Datchet, in the county of Buckingham, England, respectively, have invented certain new and useful Improvements in Side Cars for Motor Cycles (for which I have filed an application in England March 11, 1921), of which the following is a specification.

Our invention relates to a side car for a bicycle, particularly for a motorcycle or motor driven bicycle, and the invention has for its principal objects: to provide a frame structure for the side car which will be strong and firmly attached to the motorcycle body but sufficiently resilient or flexible so that it will yield when the vehicle passes over road inequalities or rounds curves; and to so construct and attach the side car to the motorcycle that its connection thereto does not, by exerting any side pull, affect the ease of steering the motorcycle or interfere with the tendency of the front or steering wheel of the motorcycle to automatically re-align with the driving wheel after it has been turned from such normal alignment.

The invention consists in the new and improved constructions, arrangements and devices to be hereinafter described and claimed for carrying out the above stated objects and such other incidental objects as will be referred to in the following description of the preferred embodiments of the invention shown in the accompanying drawings. The drawings show two such embodiments, one involving the attachment of the side car to a conventional type of motorcycle having a diamond frame and front fork for the steering wheel; and the other, the attachment of the side car to a low suspension type of motorcycle, the frame of which comprises two girder frames substantially horizontal and arranged substantially at the level of the wheel centers, at the forward end of which the front wheel is mounted on a yoke or bracket pivoted to and resiliently connected with the girder frames.

In the drawings,

Fig. 1 is a plan view of the cycle body and the frame of the side car.

Fig. 2 is a side elevation of the cycle body showing the devices thereon for attaching the side car thereto.

Fig. 3 is a longitudinal fragmentary sectional view on line 3—3 of Fig. 1 through the main frame member of the side car and the part of the motorcycle body to which said frame member is anchored.

Fig. 4 is a plan view, with parts in section, illustrating the side car of our invention as attached to a motorcycle of the low suspension type above referred to.

Fig. 5 is a sectional view illustrating the means for attaching the forward end of the side car frame to the forward portion of the motorcycle body, and Fig. 6 is a fragmentary side elevation of the forward end of the motorcycle with parts shown in vertical section.

Referring first to Figs. 1, 2 and 3:

The side car frame comprises a main transverse member 1, a forward diagonal member 2, a rear transverse member 3 and longitudinal members 4. The parts just referred to are preferably made of metal tubes and are all light enough so that the structure will be slightly resilient or flexible. The cycle shown in Figs. 1, 2 and 3 is of well known construction and the free end of the diagonal member 2 of the side car frame is detachably secured to the forward down tube 5 of the cycle by being pivoted or hinged thereto in any suitable manner, for example, by means of a pivot stud $5^a$ engaging a bracket $5^b$ on the down tube 5. The free end of the rear transverse member 3 is hinged or pivoted by a substantially horizontal pivot stud $6^a$ to a lug or bracket $6^b$ on the chain stay 6 of the cycle. The inner end of the main transverse member 1 extends transversely across the engine cradle plates or brackets 7 just rearward of the engine crank case 8 and is anchored in that position in such a manner as to provide a rigid and stable connection. As shown in the drawings, the member 1 extends through a sleeve $7^a$ between and projecting beyond plates 7 and has secured thereto a collar $1^c$ to bear against said sleeve the other end of member 1 being threaded for nuts $1^d$, $1^e$.

The main transverse member 1 is preferably reinforced at its inner or anchored end by one or more tubular liners $1^a$, $1^b$ which are shorter than member 1. If two liners are used as shown, the inner liner is shorter than the intermediate liner. This arrangement strengthens the part of the frame member subject to the greatest stress without depriving said member of a certain amount of flexibility.

It will be seen that when the cycle and side car pass over road inequalities or round curves the side car frame will yield to a certain extent because of the flexibility of the side car frame and the hinged connections of the braces 2 and 3 with the motorcycle body. This gives the combined vehicle improved riding qualities and stability. The long bearing between the main frame member 1 and the sleeve 7ª insures a firm and reliable attachment of the side car to the motorcycle.

In Figs. 4, 5 and 6, illustrating the application of the side car to the motorcycle having a frame of the twin girder type, the girder frame members are designated 9 and 10. A sleeve or tube 11 is preferably provided which spans the space between the girder frames. This sleeve provides a long bearing for the end of frame member 1, the frame member being secured in the sleeve as shown in Figs. 1, 2 and 3. The rear transverse member 3 is pivoted, detachably, by means of a pivot stud 9ª to a bracket 9ᵇ on one of the girder frames 9. The forward end of the diagonal brace 2 is provided with a shank 13 connected by a pivot stud 14 to a bracket 15 secured by bolts 16 to a casting 17 on a transverse member 18 which connects the forward end of the girder frames 9 and 10. The connection of brace 2 is directly below casting 17, as shown in Fig. 6, that is to say, is in line with the front and rear wheels 19 and 20 and preferably below the center of revolution of the front wheel. As indicated in Fig. 6, the front or steering wheel is mounted on a yoke 21 pivoted to castings 22 on the forward ends of the frame members 9 and 10, the frame members being bowed outwardly, as indicated in Fig. 4, to allow steering movements of the wheel and springs 23 being interposed between the yoke 21 and spring abutments 23ª on the upper ends of bolts 23ᵇ which are secured to the castings 22. The hub 24 of the front wheel revolves on a hollow axle 25 which is pivoted to the yoke 21 by means of a pivot stud 26 which is inclined backwardly from the vertical. Any suitable means may be employed for turning the wheel on the pivot stud 26. The front wheel mounting and steering arrangements form no part of our invention and are shown merely to illustrate one of the features of the side car which is the subject matter of this invention, namely, the attachment of the front end of the side car in such a way as not to affect, through undesirable side pull, the steering movements of the front wheel and the stability of the motorcycle when in movement. When the forward brace or pulling member 2 of the side car is attached to the motorcycle as shown, that is, at a point in line with the wheels, and not substantially above, but rather preferably below, the center of revolution of the front wheel, the drag of the side car on the motorcycle will have no tendency to pull the motorcycle to one side nor will it interfere with the automatic return to alignment of the front wheel, after it has been turned out of such alignment in steering or meeting an obstacle, which results from the pivoting of the front wheel on an inclined axis. The pull of the side car on the front of the motorcycle being directly back of the front wheel and under its center has a tendency to help in returning the wheel to its normal position of alignment besides increasing the traction of the wheel on the road.

The side car wheel is indicated at 27, the wheel being preferably in alignment with the rear wheel 20 of the motorcycle.

As a matter of fact, it is quite possible to drive a motorcycle of this type even with the side car attached without keeping the hands on the handle bars.

This application is a continuation in part of my co-pending application Serial No. 556,302, filed April 24, 1922.

We claim:

1. In combination with a body of a motorcycle, a side car structure comprising a laterally extending, tubular frame member, means for rigidly anchoring one end of same to the motorcycle body, and a reinforced tube shorter than and telescoped within the anchored end of said frame member.

2. The combination with a motorcycle frame of the type comprising two laterally spaced girders extending from the rear wheel hub to the front wheel hub, of a sleeve between said girders and a laterally extending side car frame having a main transverse member extending through said sleeve and bearing in said girders.

3. In combination with a motorcycle body having a pair of substantially horizontal spaced girder frames at substantially the level of the wheel centers, and a sleeve between and connected with said girder frames; a side car comprising a slightly flexible frame member which extends through and is anchored to said sleeve and a pair of bracing members connected to the outer end of said frame member and hinged to the motorcycle body so that the outer portion of the side car structure is free to move up and down with respect to the motorcycle through the bending of said flexible member.

4. In combination with a motorcycle body having a pair of substantially horizontal spaced girder frames at substantially the level of the wheel centers, a sleeve between and connected with said girder frames; a side car comprising a frame member which extends through and is anchored to said sleeve, and forward and rear braces connected with the outer end of said frame member and hinged to the motorcycle body.

5. In combination with a motor bicycle comprising a front steering wheel and a rear driving wheel, a frame, a yoke structure which is pivoted to and extends forwardly from the frame in an approximately horizontal direction on which said front wheel is revolubly mounted and is turnable for steering on an axis inclined upwardly and backwardly, and a side car, the forward end of which is attached to the motorcycle in line with and between said wheels and at a point not substantially above the front wheel center.

6. In combination with a motor bicycle comprising a front steering wheel and a rear driving wheel, a substantially horizontal frame at substantially the level of the wheel centers, and a yoke structure pivoted to and extending forwardly from the forward part of the frame on which the front wheel is revolubly mounted, and is turnable for steering on an axis inclined upwardly and backwardly, and a side car the forward end of which is attached to the motor bicycle in line with and between said wheels and at a point below the center of the front wheel.

7. The combination with a motorcycle comprising a pair of substantially horizontal spaced girder frames at substantially the level of the wheel centers, a front steering wheel, and a yoke pivoted and resiliently connected with the forward ends of the girder frames to which the front wheel is mounted for revolution and for steering on an axis inclined backwardly from the vertical; of a side car structure the forward end of which is pivotally attached to the motorcycle body at a point in line with and between said wheels and below the center of the front wheel, an outwardly extending frame member somewhat flexible which is rigidly anchored to said girder frames, a longitudinal frame member, and a brace from the rear end of said longitudinal member pivoted to one of the girder frames near the end thereof.

8. The combination with a motorcycle comprising front and rear wheels, a pair of substantially horizontal spaced girder frames at substantially the level of the wheel centers, a sleeve spanning and connected to said girder frames, and a yoke pivoted to and resiliently connected with the forward ends of the girder frames, the front wheel being mounted on said yoke to turn for steering on an axis inclined backwardly from the vertical; of a side car structure comprising a tubular main frame member, means for anchoring one end of the same in said sleeve, a rear transverse frame member pivoted to one of said girder frames, and a forward diagonal bracing member pivotally attached to the motorcycle body in line with the wheels and back of and below the center of the front wheel.

HARRY HOLLINS POWELL.
WILLIAM SHACKLETON.